(12) United States Patent
Pierce et al.

(10) Patent No.: US 9,084,437 B1
(45) Date of Patent: Jul. 21, 2015

(54) AUTOMATED SYSTEM FOR PITTING DRIED FRUIT

(75) Inventors: Brian Pierce, Chico, CA (US); Carmel J. Ramsey, Marysville, CA (US); Matthew Kelly, Yuba City, CA (US)

(73) Assignee: Sunsweet Growers Inc., Chico, CA (US)

( * ) Notice: Subject to any disclaimer, the term of this patent is extended or adjusted under 35 U.S.C. 154(b) by 1277 days.

(21) Appl. No.: 12/661,180

(22) Filed: Mar. 10, 2010

(51) Int. Cl.
*A01J 11/00* (2006.01)
*A23N 4/12* (2006.01)
*A47J 25/00* (2006.01)
*A23N 4/06* (2006.01)
*A21C 13/00* (2006.01)

(52) U.S. Cl.
CPC .. *A23N 4/06* (2013.01); *A21C 13/00* (2013.01)

(58) Field of Classification Search
CPC ............. A23N 4/02; A23N 4/06; A23N 4/04; A23N 7/005; A47J 43/24; A47J 27/04; A23L 3/0155; A23B 7/144; A23B 4/052; A21C 13/00; G05B 19/41875; H01L 22/20
USPC ........... 99/547, 495, 561, 549, 472, 467, 468, 99/473–476; 700/108–110; 702/82
See application file for complete search history.

(56) References Cited

U.S. PATENT DOCUMENTS

| | | | | |
|---|---|---|---|---|
| 2,612,197 A * | 9/1952 | Giordano | | 99/561 |
| 3,331,375 A * | 7/1967 | Hickey et al. | | 134/127 |
| 3,442,313 A * | 5/1969 | Cudd et al. | | 426/231 |
| 4,122,951 A * | 10/1978 | Alaminos | | 209/545 |
| 4,183,292 A * | 1/1980 | Banks | | 99/468 |
| 4,417,405 A * | 11/1983 | Fuller, Jr. | | 34/519 |
| 4,629,629 A * | 12/1986 | David | | 426/482 |
| 4,937,088 A * | 6/1990 | Gosselin et al. | | 426/481 |
| 4,957,043 A * | 9/1990 | Silvestrini et al. | | 99/472 |
| 5,020,237 A * | 6/1991 | Gross et al. | | 34/265 |
| 5,135,122 A * | 8/1992 | Gross et al. | | 219/685 |
| 5,386,766 A * | 2/1995 | Segredo et al. | | 99/495 |
| 5,609,097 A * | 3/1997 | Newnan | | 99/470 |
| 5,621,669 A * | 4/1997 | Bjornsson | | 702/85 |
| 6,410,872 B2 * | 6/2002 | Campbell et al. | | 209/577 |
| 6,909,070 B2 * | 6/2005 | Veltrop et al. | | 219/401 |
| 2007/0246404 A1 * | 10/2007 | Pierce | | 209/555 |

\* cited by examiner

*Primary Examiner* — Dana Ross
*Assistant Examiner* — Hemant Mathew
(74) *Attorney, Agent, or Firm* — Van Pelt, Yi & James LLP

(57) ABSTRACT

A system for controlling a pitting system is disclosed. The system comprises a processor configured to: receive a first sensor data; receive a second sensor data; and determine a prune processing parameter based at least in part on the first sensor data and the second sensor data. The system further comprises a memory coupled to the processor and configured to provide the processor with instructions.

19 Claims, 7 Drawing Sheets

AUTOMATED SYSTEM FOR PITTING DRIED FRUIT

BACKGROUND OF THE INVENTION

Dried fruit arrives at a pitting facility with a wide variety of characteristics including moisture content and a range of sizes. A pitting facility has a goal of producing a package of pitted fruit with desired moisture characteristics. However, dried fruit pitting systems comprise many parts, including fruit washers, fruit steamers, fruit pitting mechanisms, pit and pitted fruit sorting devices, fruit packaging systems, and fruit transportation systems each with a number of parameters that are adjustable (e.g., fruit transportation speed, steamer temperature and steam density, fruit pitting mechanism speed, time spent in fruit washer, etc.). In the event that the parameters of each of the parts of the pitting system are not adjusted appropriately, pitting yield and/or moisture characteristics will not achieve target goals.

BRIEF DESCRIPTION OF THE DRAWINGS

Various embodiments of the invention are disclosed in the following detailed description and the accompanying drawings.

DETAILED DESCRIPTION

Figure 1:
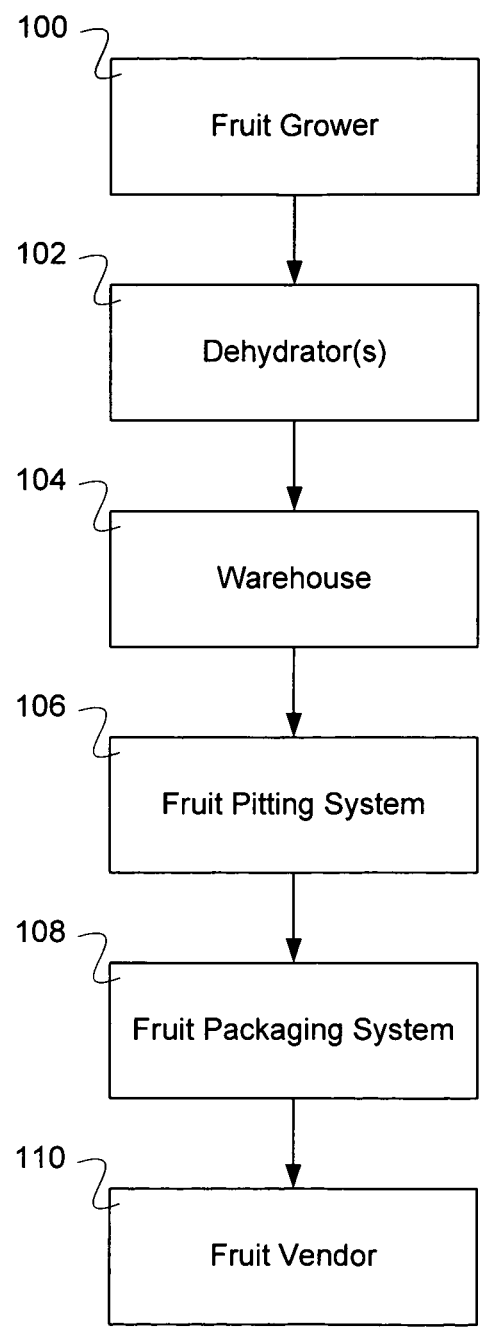
FIG. 1 is a block diagram illustrating an embodiment of a pitted dried fruit production system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for controlling a pitting system is disclosed. The system comprises a processor configured to: receive a first sensor data; receive a second sensor data; and determine a prune processing parameter based at least in part on the first sensor data and the second sensor data. The system further comprises a memory coupled to the processor and configured to provide the processor with instructions.

A system for prune processing is disclosed. A first sensor data is received. A second sensor data is received. A prune processing parameter is determined based at least in part on the first sensor data and the second sensor data. In various embodiments, a temperature, a weight, a moisture, a count, a pitting, a reject count, an accept count, or any other appropriate sensor data is used to determine a prune processing parameter. In various embodiments, prune processing comprises accepting dried prunes, sorting prunes, adding moisture to prunes, steaming prunes, heating prunes, pitting prunes, or any other appropriate prune processing stage.

In some embodiments, an automated system for pitting fruit is disclosed. The system comprises an automated controller for receiving system measurements and sending system control parameters. It additionally comprises a first moisture measurement device prior to a fruit steamer and a second moisture measurement device after a fruit pitter. Measurements from the two moisture measurement devices are received by the automated controller and used to calculate a fruit steamer operation parameter. In some embodiments, measurements of successfully pitted fruit yield are received by the automated controller from a pitted fruit acceptor/rejecter device and taken into account in the calculation of the fruit steamer operation parameter. In some embodiments, received measurements are additionally used to calculate a fruit transportation speed, a fruit pitting speed, or any other appropriate fruit pitting system parameters.

In various embodiments, in the event that a reject count is too high, pitting rate is too low, or any other appropriate data is out of range, the system indicates that equipment is needed to be checked.

In some embodiments, the fruit (e.g., a prune) pitting system additionally comprises a pit and pitted fruit separation mechanism. The pit and pitted fruit separation mechanism comprises a rejecter for rejecting pits and improperly pitted fruit. In some embodiments, the pit and pitted fruit separation mechanism also comprises an acceptor following the rejecter for accepting any good pitted fruit mistakenly rejected by the rejecter.

In some embodiments, a manufacture (e.g., a pitted packaged fruit) obtained using a process comprising measuring a first moisture sensor, measuring a second moisture sensor, and determining a steamer operating parameter is disclosed. A pitted packaged fruit is produced using manufacturing steps comprising one or more of the following: receiving dried fruit, sorting fruit for size, washing fruit, hydrating fruit (e.g., using a bath and/or steamer), pitting fruit, removing unpitted or partially pitted fruit, and packaging fruit.

FIG. 1 is a block diagram illustrating an embodiment of a pitted dried fruit production system. In various embodiments, the system of FIG. 1 is used to produce pitted dried prunes, or any other appropriate pitted dried fruit. In the example shown, fruit grower 100 grows the fruit and transports it to dehydrator(s) 102, where it is dried before storage. In some embodiments, fresh fruit is delivered to dehydrators to be dried to approximately 18% moisture providing a stable product for storage; dried fruit is delivered to warehouse 104 for the dried fruit, which stores dried, natural condition fruit produced by one or more than one different fruit growers. Dried fruit is received, graded, sized and sorted for surface defects. In some embodiments, fruit from different growers stored in warehouse 104 is stored according to fruit categories (e.g., by fruit size, by fruit grade—high quality or with no rot, low quality with rot, by district/area/zone/part of a state where the fruit was grown, by crop year) In some embodiments, fruit from different growers stored in warehouse 104 is processed using a distinct set of processing parameters for each fruit category in the subsequent processing steps. In the example shown, fresh fruit is transported from field to dehydrator(s) 102 and is dried. Dried fruit is transported to warehouse 104. Fruit is steamed then pitted in fruit pitting system 106. In various embodiments, fruit pitting system 106 comprises an automatic controller for optimization of good pitted fruit yield, for control of moisture content of output fruit within a range suitable for fruit packaging system 108, for minimization of processing time, for minimization of processing cost, or for any other appropriate control target or targets. In some embodiments, fruit pitting system 106 comprises a set of nominal control parameters (e.g., based on fruit size, fruit moisture, fruit grower, etc.) used as a starting point for process optimization. In some embodiments, fruit pitting system 106 comprises a set of nominal control parameters used as a starting point for process optimization for each fruit category stored in warehouse 104. Fruit processed by fruit pitting system 106 is delivered to fruit packaging system 108, where it is packaged and prepared for sale. Packaged fruit is then delivered to fruit vendor 110 and sold.

Figure 2:
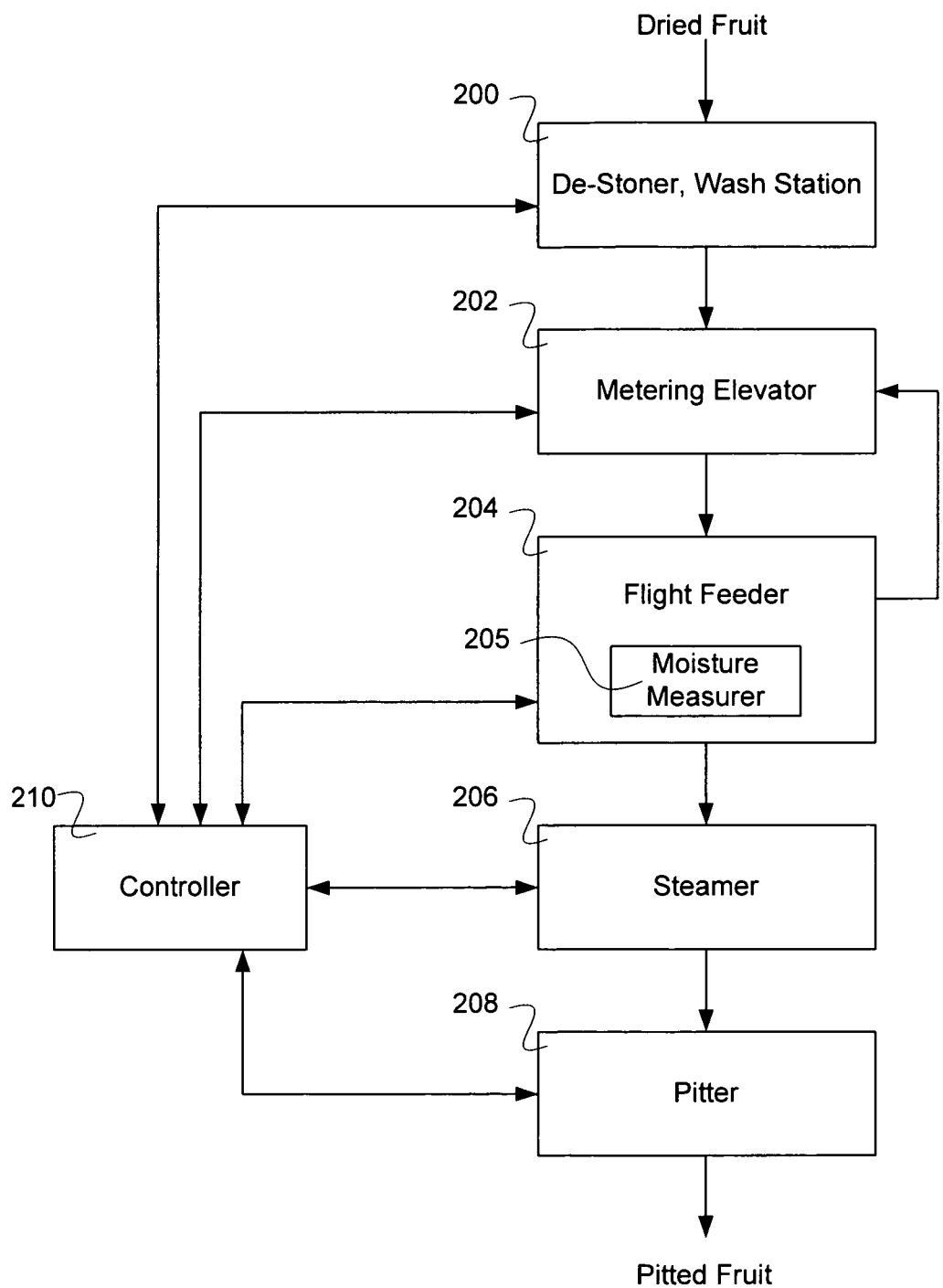
FIG. 2 is a block diagram illustrating an embodiment of a fruit pitting system.

FIG. 2 is a block diagram illustrating an embodiment of a fruit pitting system. In some embodiments, the fruit pitting system of FIG. 2 comprises fruit pitting system 106 of FIG. 1. In the example shown, dried fruit entering the fruit pitting system first goes to de-stoner, wash station 200. Operating on a hydro lift, de-stoner, wash station 200 serves to remove dirt or particles that have accumulated on the fruit during the drying, storing, and transportation processes. In some embodiments, de-stoner, wash station 200 is additionally designed to add moisture to the fruit. After washing, the dried fruit enters metering elevator 202. Metering elevator 202 transports fruit to flight feeder 204 (e.g., a Shuffalo flight feeder) while measuring the moisture content of the fruit (e.g., using moisture measurer 205). In some embodiments, metering elevator 202 comprises a hydro lift for raising fruit to the level of flight feeder 204. In some embodiments, metering elevator 202 comprises a hydro lift for raising fruit to the level of flight feeder 204 using a water bath. In various embodiments, fruit moisture content is measured using moisture measurer 205 by measuring the fruit electrical impedance (e.g., AC impedance which is correlated with moisture content), by measuring the fruit absorption of microwave energy, by measuring the fruit mechanical stiffness, by measuring the fruit reflectivity of infrared light, or by any other appropriate fruit moisture measurement means. Flight feeder 204 delivers fruit to steamer 206 at a predetermined rate. In various embodiments, the rate that flight feeder 204 delivers fruit to steamer 206 is controlled by an automatic controller (e.g., controller 210), by a human operator, or by any other appropriate control means. In various embodiments, the rate that flight feeder 204 delivers fruit to steamer 206 is determined at least in part using the first moisture measurement taken at metering elevator 202, the moisture measurement taken at pre-packaging moisture meter, a measurement of good pitted fruit yield taken at pitted fruit acceptor/rejecter, or using any other appropriate control signal. In some embodiments, steamer 206 comprises more than one steamer, and flight feeder 204 delivers fruit to each steamer. In some embodiments, in the event that fruit is delivered to flight feeder 204 by metering elevator 202 at a higher rate than flight feeder 204 is set to deliver fruit to steamer 206, the excess fruit is returned to metering elevator 202. In some embodiments, there is a target temperature and moisture content for the fruit for good pitting (e.g., 200° F. and 20-40% moisture). In some embodiments, steamer 206 includes a separate infrared heater for adding just heat and not moisture to the fruit. In some embodiments, there is a separate heater from steamer 206 for adding just heat and not moisture to the fruit.

Steamer 206 comprises a fruit steamer for increasing the moisture content and temperature of fruit. In various embodiments, fruit is steamed in order to improve the good pitted fruit yield, to improve the packaged fruit packing density, to improve the fruit taste or other customer appeal, or for any other appropriate reason. In some embodiments, the fruit is steamed in order to bring the processed fruit moisture content to within a specified range. In various embodiments, control parameters for steamer 206 comprise fruit transport rate, steam temperature or steam pressure (these two parameters are correlated), position of exhaust damper, or any other appropriate steamer control parameters. In various embodiments, steamer 206 has temperature sensors, humidity sensors, stream pressure sensors, or any other appropriate steamer sensor. In some embodiments, steamer 206 sensors provide measurement data to an automatic control system (e.g., controller 210). In various embodiments, the steamer control parameters are controlled by an automatic controller (e.g., controller 210), by a human operator, or by any other appropriate control means. In various embodiments, the steamer control parameters are determined at least in part using the first moisture measurement taken at metering elevator 202, the second moisture measurement taken at pre-packaging moisture meter, a measurement of good pitted fruit yield taken at pitted fruit acceptor/rejecter, or using any other appropriate control signal.

Pitter 208 comprises a mechanical fruit pitter for pitting fruit after it has been steamed. Pitter 208 picks up, using a set of jaws, an individual tenderized fruit that is then cut and punched to remove the pit. In some embodiments, pitter 208 includes sensors for indicating whether a fruit is pitted, partially pitted, containing a pit (e.g., and optical pitting sensor). In some embodiments, pitter 208 provides data to an automated control system. In some embodiments, pitter 208 runs continuously at its maximum possible pitting rate or at a predetermined optimal pitting rate. In some embodiments, pitter 208 runs at a pitting rate specified by an external controller (e.g., controller 210). In various embodiments, an external controller comprises an automatic controller (e.g., controller 210), a human operator, or any other appropriate control means. In various embodiments, the pitting rate is determined at least in part using the moisture measurement taken by metering elevator 202, the moisture measurement taken by pre-packaging moisture meter, a measurement of good pitted fruit yield taken by pitted fruit acceptor/rejecter, or using any other appropriate control signal.

Controller 210 receives input signal data from sensors and provides control signal data for de-stoner wash station 200, metering elevator 202, flight feeder 204, steamer 206, and pitter 208 and any sub-component sensors and/or actuators/ motors. In various embodiments, controller 210 receives input signal data related to temperature, pressure, feed rate, pitting quality, fruit defects, acceptance rate, reject rate, or any other appropriate fruit processing data. In various embodiments, controller 210 provides control signal data related to temperature, pressure, feed rate, pitting rate, pitting force, or any other appropriate fruit processing control signal.

Figure 3:
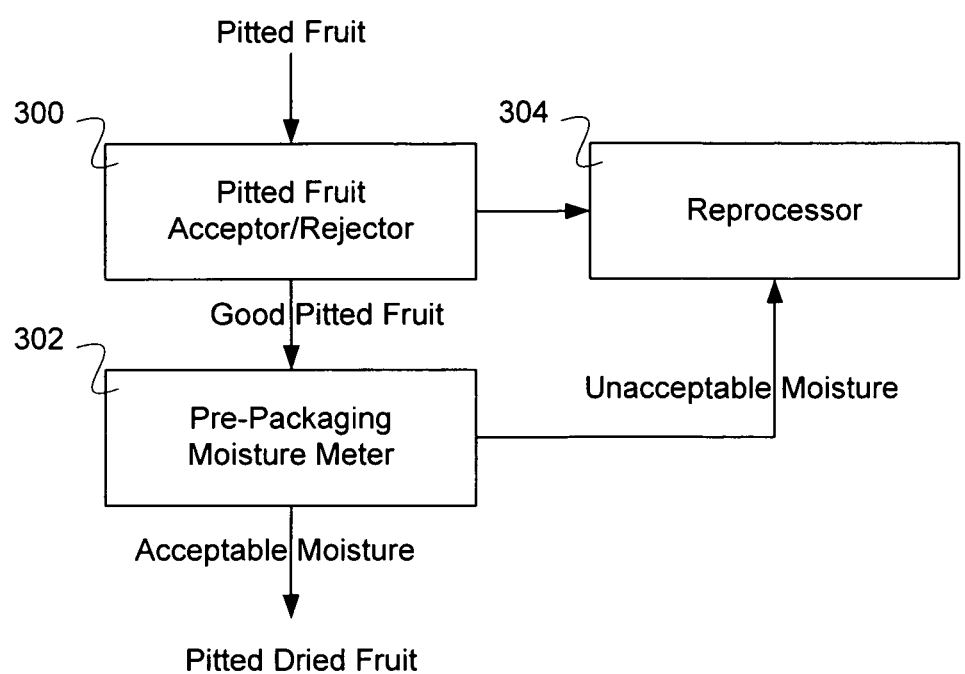
FIG. 3 is a block diagram illustrating an embodiment of a fruit processing system.

FIG. 3 is a block diagram illustrating an embodiment of a fruit processing system. In the example shown, pitted fruit acceptor/rejecter 300 comprises a system for separating good pitted fruit from pits and improperly pitted fruit. In various embodiments, good pitted fruit is separated from pits and improperly pitted fruit using an optical detector, a mechanical separator, a combination of optical and mechanical techniques, or any other appropriate separation technique. In some embodiments, pitted fruit acceptor/rejecter 300 comprises a waste rejecter for detecting pits and improperly pitted fruit and rejecting them and reprocessing (e.g., processing for juice). In some embodiments, pitted fruit acceptor/rejecter 300 comprises a good fruit detector following the waste rejecter for determining good fruit that had previously been rejected as waste. In some embodiments, pitted fruit acceptor/ rejecter 300 additionally comprises a yield measurement device for determining the fraction of incoming fruit that has been successfully pitted. In various embodiments, the yield measurement device comprises an incoming fruit counter and a good pitted fruit counter, an incoming fruit counter and an improperly pitted fruit counter, a pit counter and an improperly pitted fruit counter, a pitter gate counter, a pit detector counter, a pitted fruit detector counter, or any other appropriate yield measurement device component or components. Pits and improperly pitted fruit rejected are sent to reprocessor 304. In some embodiments, fruit sent to reprocessor 304 is disposed of without further processing. In some embodiments, improperly pitted fruit is separated and processed into a processed fruit product, e.g. fruit juice, fruit jam, etc. In some embodiments, all waste sent to reprocessor 304 is processed into a processed agricultural other products, e.g., compost, animal feed, etc. Good pitted fruit from pitted fruit acceptor/rejecter 300 is sent to pre-packaging moisture meter 302, where the final moisture content is measured. In various embodiments, fruit moisture content is measured by measuring the fruit electrical impedance, by measuring the fruit absorption of microwave energy, by measuring the fruit mechanical stiffness, by measuring the fruit reflectivity of infrared light, or by any other appropriate fruit moisture measurement means. In some embodiments, if the fruit moisture content is not within a predetermined range, the fruit is processed into other products by reprocessor 304.

Figure 4:
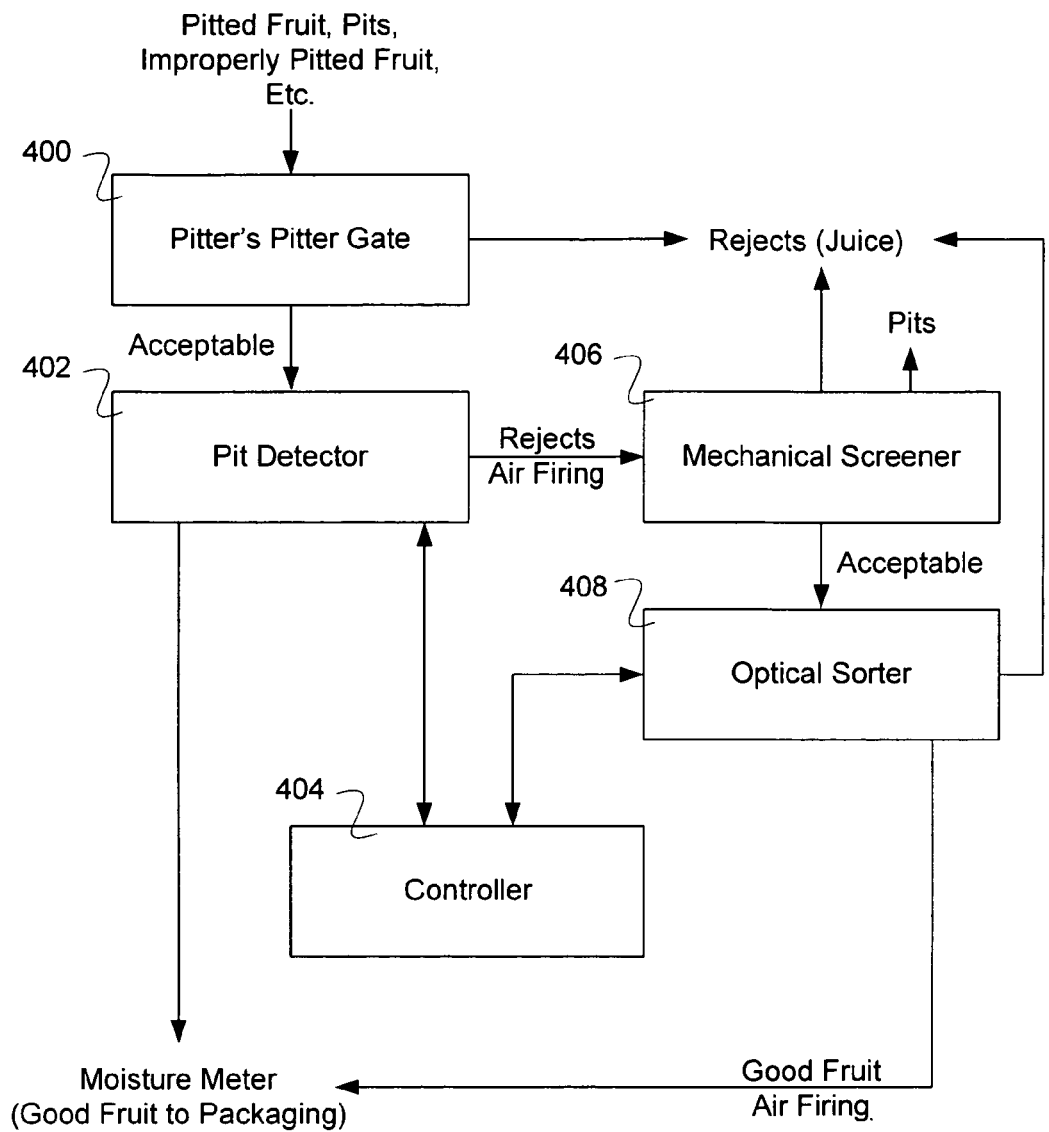
FIG. 4 is a block diagram illustrating an embodiment of a pitted fruit acceptor/rejecter.

FIG. 4 is a block diagram illustrating an embodiment of a pitted fruit acceptor/rejecter. In some embodiments, the pitted fruit acceptor/rejecter of FIG. 3 is pitted fruit acceptor/rejecter 300 of FIG. 3. In the example shown, output from a pitter (e.g., pitter 208 of FIG. 2) is received by pitter gate 400. In various embodiments, pitter output comprises pitted fruit, pits, improperly pitted fruit, unpitted fruit, or any other appropriate pitter output. Pitter gate 400 comprises a monitor on the fruit transport system for detecting and removing unpitted fruit or improperly pitted fruit. In various embodiments, pitter gate 400 comprises an optical sensor, a mechanical sensor, or any other appropriate unpitted or improperly pitted fruit sensor. Unpitted or improperly pitted fruit is rejected from the pitted fruit acceptor/rejecter. Pitted fruit that is accepted by the pitter gate then enters pit detector 402.

Pit detector 402 comprises a monitor on the fruit transport system for detecting and removing any remaining pits. In various embodiments, pit detector 402 comprises an optical sensor, a mechanical sensor, or any other appropriate pit sensor. Pits detected by pit detector 402 are redirected (e.g., by firing air to separate the fruit with a detected pit) to mechanical screener 406. Mechanical screener 406 comprises a mechanical separator (e.g., a squirrel cage) for separating pits from fruit and removing pits still loosely attached to fruit. In the event that the pit is successfully removed by mechanical screener 406, fruit is directed to an optical sorter 408 which sorts good fruit (e.g., by firing air to separate the good fruit) to a moisture meter that measures moisture of the fruit before packaging and rejected fruit to be reprocessed. In the event that the pit is not successfully removed by mechanical screener 406, the fruit is rejected and reprocessed (e.g., juiced). Pits removed by mechanical screener 406 are also reprocessed (e.g., as ground cover).

Good fruit without pits is directed by pit detector 402 to a prepackaging moisture meter, which is then checked to see whether the moisture content of the fruit is within acceptable realm.

Controller 404 receives input from optical sorter 408 and pit detector 402. In various embodiments, controller 404 receives inputs from pitter's gate 400, mechanical screener 406, or any other appropriate controller.

In various embodiments, controller 404 is a separate controller, is combined with other controllers (e.g., controller 210), communicates with other controllers, or any other appropriate controller software/hardware combination.

Figure 5:
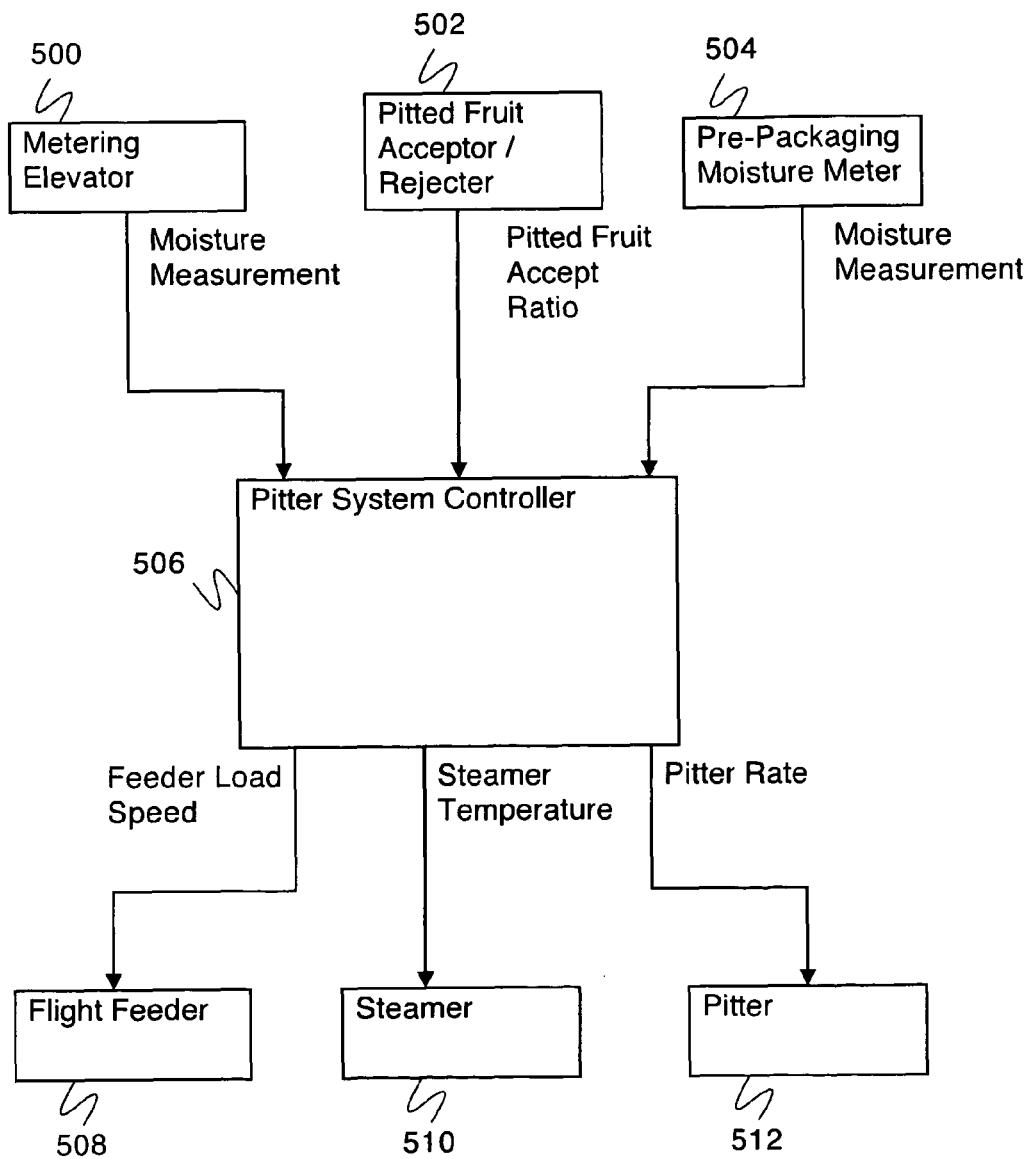
FIG. 5 is a block diagram illustrating an embodiment of the control paths in an automatic controller for controlling a dried fruit pitting system.

FIG. 5 is a block diagram illustrating an embodiment of the control paths in an automatic controller for controlling a dried fruit pitting system. In some embodiments, the dried fruit pitting system is the dried fruit pitting system of FIG. 2. In the example shown, metering elevator 500 sends a moisture measurement signal to pitter system controller 506, pitted fruit acceptor/rejecter 502 sends a pitted fruit accept ratio signal to pitter system controller 506, and pre-packaging moisture meter 504 sends a moisture measurement signal to pitter system controller 506. In some embodiments, metering elevator 500 comprises metering elevator 202 of FIG. 2.

In some embodiments, pitted fruit acceptor/rejecter 502 comprises pitted fruit acceptor/rejecter 300 of FIG. 3. In some embodiments, pre-packaging moisture meter 504 comprises pre-packaging moisture meter 302 of FIG. 3. Pitter system controller 506 receives measurement signals and generates control signals according to a predefined pitter system control algorithm. In various embodiments, the predefined pitter system control algorithm optimizes for good pitted fruit yield, for control of moisture content of output fruit within a range suitable for fruit packaging system 108 of FIG. 1, for minimization of processing time, for minimization of processing cost, or for any other appropriate control target or targets.

In the example shown, flight feeder 508 receives a feeder load speed signal from pitter system controller 506, steamer 510 receives a steamer temperature signal from pitter system controller 506, and pitter 512 receives a pitter rate signal from pitter system controller 506. In some embodiments, flight feeder 508 comprises flight feeder 204 of FIG. 2. In some embodiments, steamer 510 comprises steamer 206 of FIG. 2. In some embodiments, pitter 512 comprises pitter 208 of FIG. 2.

In various embodiments, pitter system controller 506 receives measurement information from one or more pitters (e.g., pitter 512 sensor information regarding pitted fruit, non-pitted fruit, partially pitted fruit), one or more steamers (e.g., steamer 510 temperature(s), pressure(s), humidity, exhaust flow, etc.) or any other appropriate measurement information.

Figure 6:
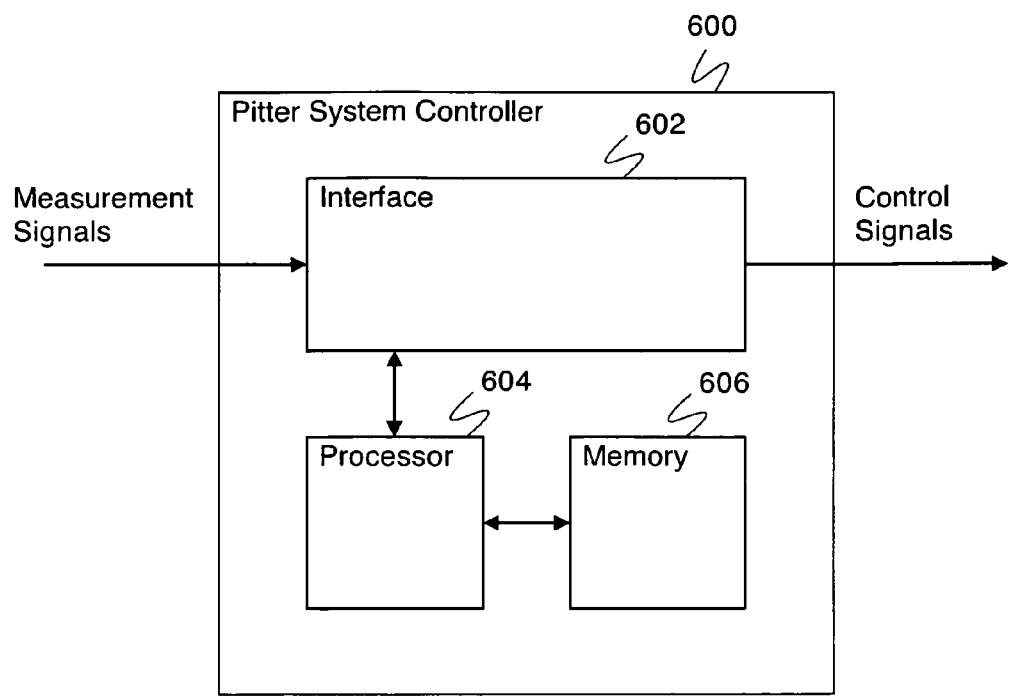
FIG. 6 is a block diagram illustrating an embodiment of a pitter system controller.

FIG. 6 is a block diagram illustrating an embodiment of a pitter system controller. In some embodiments, pitter system controller 600 comprises pitter system controller 506 of FIG. 5. In the example shown, pitter system controller 600 comprises interface 602, processor 604, and memory 606. Interface 602 comprises an interface for connecting control and measurement signals sent and received by pitter system controller 600 with processor 604. In various embodiments, interface 602 comprises one or more of an analog to digital interface, a digital to analog interface, analog amplification, filtering, or any other appropriate interface components. In some embodiments, interface 602 is not present, and processor 604 interacts directly with systems sending control signals or receiving measurement signals from pitter system controller 600. Processor 604 executes a control algorithm for determining output control signals from input measurement signals. Memory 606 stores instructions for the control algorithm which can be provided to processor 604 for execution. The control algorithm can be stored as instructions that are stored in a computer readable storage medium (e.g., a hard disk drive, a read-only memory device, etc.).

Figure 7:
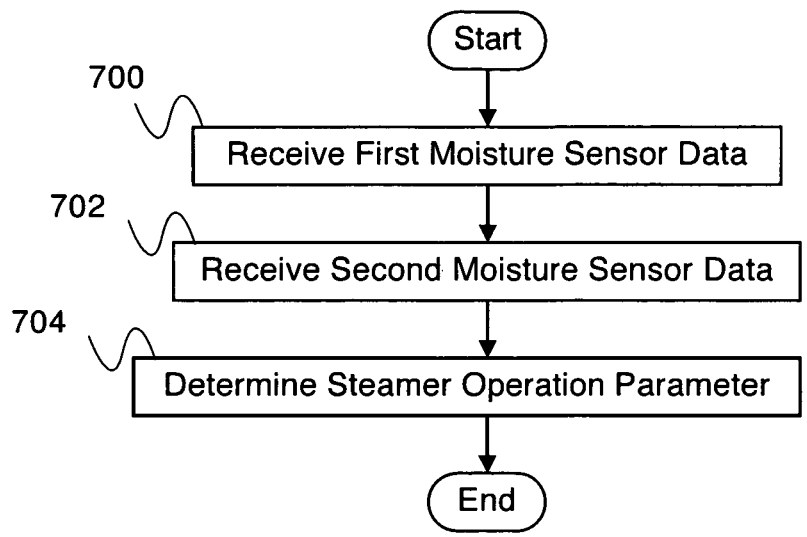
FIG. 7 is a flow diagram illustrating an embodiment of a process for controlling an automated system for pitting dried fruit.

FIG. 7 is a flow diagram illustrating an embodiment of a process for controlling an automated system for pitting dried fruit. In some embodiments, this process is used by a pitter system controller (e.g., pitter system controller 506 of FIG. 5) for controlling a fruit pitting system (e.g., fruit pitting system 106 of FIG. 1). In the example shown, in 700, a first moisture sensor data is received. In some embodiments, the first moisture sensor data is received from a metering elevator (e.g., metering elevator 202 of FIG. 2). In 702, a second moisture sensor data is received. In some embodiments, the second moisture sensor data is received from a pre-packaging moisture meter (e.g., pre-packaging moisture meter 302 of FIG. 3). In 704, a steamer operation parameter is determined. In various embodiments, the steamer operation parameter comprises fruit transport speed, steam temperature, steam pressure, or any other appropriate steamer operation parameter. In various embodiments, a pitter operation parameter is additionally determined, a flight feeder operation parameter is additionally determined, or any other appropriate operation parameter is additionally determined. In some embodiments, a pitted fruit accept ratio signal is additionally received—for example, a signal proportional to the ratio of accepted fruit to rejected fruit at one or more stages in the fruit processing. In some embodiments, a fiber optic system optically detects pitting effectiveness of a pitter—for example, providing an indication of the proper loading rates for the pitter, the acceptable pitting of the fruit, etc. In some embodiments, the determined operation parameters are provided to the appropriate pitter system mechanisms (e.g., the steamer operation parameter is provided to the steamer). The process then ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for controlling moisture content during processing of dehydrated fruit, comprising:
   a first sensor, wherein the first sensor takes a measurement of dehydrated fruit;
   a steamer, wherein the steamer adds moisture to the dehydrated fruit;
   a pitted fruit acceptor/rejector, wherein the pitted fruit acceptor/rejector accepts successfully pitted fruit and rejects unsuccessfully pitted fruit;
   a second sensor, wherein the second sensor measures a second sensor data for determining a pitted fruit accept ratio signal;
   a processor configured to:
      receive a first sensor data from the first sensor, wherein the first sensor data includes moisture data;
      receive the second sensor data from the second sensor;
      determine, based at least in part on the second sensor data, the pitted fruit accept ratio signal, wherein the pitted fruit accept ratio signal comprises a signal that is proportional to the ratio of successfully pitted fruit to unsuccessfully pitted fruit after the pitted fruit acceptor/rejector has accepted or rejected the pitted fruit; and
      determine a processing parameter based at least in part on the first sensor data and the second sensor data, wherein the processing parameter comprises an operation parameter of the steamer that controls an addition of moisture to the dehydrated fruit by the steamer, wherein the determining of the processing parameter comprises:
         determine whether the second sensor data exceeds a first threshold;
         in the event the second sensor data fails to exceed the first threshold:
            determine whether the first sensor data falls below a second threshold;
            in the event that the first sensor data falls below the second threshold, modify the operation parameter to increase the addition of moisture to the dehydrated fruit by the steamer;
            determine whether the first sensor data exceeds a third threshold; and
            in the event that the first sensor data exceeds the third threshold, modify the operation parameter to decrease the addition of moisture to the dehydrated fruit by the steamer; and
   a memory coupled to the processor and configured to provide the processor with instructions.

2. The system as in claim 1, wherein the first sensor data comprises moisture sensor data for dehydrated fruit prior to the steamer.

3. The system as in claim 1, further comprising a third sensor, and wherein the processor is configured to receive a third sensor data from the third sensor, wherein the third sensor data comprises a moisture sensor data.

4. The system as in claim 1, wherein the processor is further configured to provide the operation parameter of the steamer to the steamer.

5. The system as in claim 1, further comprising a fourth sensor, wherein the fourth sensor measures a fourth sensor data that comprises one or more of the following: a temperature sensor, a weight sensor, or a counter.

6. The system as in claim 3, wherein the first sensor data comprises a sensor data that is taken at an input to a stage in the processing of dehydrated fruit and the third sensor data comprises a sensor data that is taken at an output to the stage.

7. The system as in claim 1, wherein the processor is further configured to determine a second processing parameter comprising a pitter operation parameter.

8. The system as in claim 7, wherein the pitter operation parameter comprises a pitting rate.

9. The system as in claim 1, wherein the processor is further configured to determine a second processing parameter comprising a flight feeder operation parameter.

10. The system as in claim 9, wherein the flight feeder operation parameter comprises a feeder rate.

11. The system as in claim 1, wherein the first sensor comprises an electrical impedance moisture sensor.

12. The system as in claim 1, wherein the operation parameter comprises steam temperature.

13. The system as in claim 1, wherein the operation parameter comprises steam pressure.

14. The system as in claim 1, wherein the operation parameter comprises fruit transport speed.

15. A method for controlling moisture content during processing of dehydrated fruit, comprising:
    receiving a first sensor data from a first sensor, wherein the first sensor takes a measurement of dehydrated fruit, and wherein the first sensor data includes moisture data;
    receiving a second sensor data from a second sensor, wherein the second sensor measures a second sensor data for determining a pitted fruit accept ratio signal;
    determining, based at least in part on the second sensor data, the pitted fruit accept ratio signal, wherein the pitted fruit accept ratio signal comprises a signal that is proportional to the ratio of successfully pitted fruit to unsuccessfully pitted fruit after a pitted fruit acceptor/rejector has accepted or rejected the pitted fruit; and
    determining, using a processor, a processing parameter based at least in part on the first sensor data and based at least in part on the second sensor data, wherein the processing parameter comprises an operation parameter of the steamer that controls an addition of moisture to the dehydrated fruit by the steamer, wherein the determining of the processing parameter comprises:
        determining whether the second sensor data exceeds a first threshold;
        in the event the second sensor data fails to exceed the first threshold:
            determining whether the first sensor data falls below a second threshold;
            in the event that the first sensor data falls below the second threshold, modifying the operation parameter to increase the addition of moisture to the dehydrated fruit by the steamer;
            determining whether the first sensor data exceeds a third threshold; and
            in the event that the first sensor data exceeds the third threshold, modifying the operation parameter to decrease the addition of moisture to the dehydrated fruit by the steamer.

16. A computer program product for controlling moisture content during processing of dehydrated fruit, the computer program product being embodied in a non-transitory computer readable storage medium and comprising computer instructions for execution on a processor, including:
    receiving a first sensor data from a first sensor, wherein the first sensor takes a measurement of dehydrated fruit, and wherein the first sensor data includes moisture data;
    receiving a second sensor data from a second sensor, wherein the second sensor measures a second sensor data for determining a pitted fruit accept ratio signal;
    determining, based at least in part on the second sensor data, the pitted fruit accept ratio signal, wherein the pitted fruit accept ratio signal comprises a signal that is proportional to the ratio of successfully pitted fruit to unsuccessfully pitted fruit after a pitted fruit acceptor/rejector has accepted or rejected the pitted fruit; and
    determining, using a processor, a processing parameter based at least in part on the first sensor data and based at least in part on the second sensor data, wherein the processing parameter comprises an operation parameter of the steamer that controls an addition of moisture to the dehydrated fruit by the steamer, wherein the determining of the processing parameter comprises:
        determining whether the second sensor data exceeds a first threshold;
        in the event the second sensor data fails to exceed the first threshold:
            determining whether the first sensor data falls below a second threshold;
            in the event that the first sensor data falls below the second threshold, modifying the operation parameter to increase the addition of moisture to the dehydrated fruit by the steamer;
            determining whether the first sensor data exceeds a third threshold; and
            in the event that the first sensor data exceeds the third threshold, modifying the operation parameter to decrease the addition of moisture to the dehydrated fruit by the steamer.

17. The system as in claim 1, wherein the addition of moisture to dehydrated fruit facilitates effective pitting of the dehydrated fruit.

18. The system as in claim 1, wherein the second sensor data comprises at least one of the following: a number of accepted fruit, a number of rejected fruit, a weight of accepted fruit, and a weight of rejected fruit.

19. The system of claim 1, wherein the pitted fruit acceptor/rejector accepts dehydrated fruit from a pitter and detects pits in the dehydrated fruit using a mechanical or an optical sensor.

* * * * *